US009005346B2

(12) United States Patent
Kang et al.

(10) Patent No.: US 9,005,346 B2
(45) Date of Patent: Apr. 14, 2015

(54) FACILITATED OLEFIN TRANSPORT MEMBRANE INCLUDING ALUMINIUM SALT

(71) Applicant: Sangmyung University Seoul Industry Academy Cooperation Foundation, Seoul (KR)

(72) Inventors: Yong-Soo Kang, Seoul (KR); Sang-Wook Kang, Seoul (KR)

(73) Assignee: Sangmyung University Seoul Industry Academy Cooperation Foundation, Seoul (KR)

( * ) Notice: Subject to any disclaimer, the term of this patent is extended or adjusted under 35 U.S.C. 154(b) by 11 days.

(21) Appl. No.: 14/083,012

(22) Filed: Nov. 18, 2013

(65) Prior Publication Data
US 2014/0262762 A1    Sep. 18, 2014

(30) Foreign Application Priority Data

Mar. 15, 2013    (KR) ........................ 10-2013-0027766

(51) Int. Cl.
*B01D 53/22* (2006.01)
*C25B 13/08* (2006.01)
*C25B 13/04* (2006.01)
*B01D 69/12* (2006.01)

(52) U.S. Cl.
CPC ................ *C25B 13/08* (2013.01); *C25B 13/04* (2013.01); *B01D 2325/16* (2013.01); *B01D 2325/14* (2013.01); *B01D 69/12* (2013.01); *B01D 2325/18* (2013.01)

(58) Field of Classification Search
CPC ........ B01D 61/00; B01D 63/00; B01D 69/00; B01D 71/00; B01D 69/12; B01D 2325/14; B01D 2325/16; B01D 2325/18
USPC ......................................... 95/43–56; 96/4–14
See application file for complete search history.

(56) References Cited

U.S. PATENT DOCUMENTS

| 3,835,207 | A | * | 9/1974 | Frost et al. ...................... 264/41 |
| 4,636,314 | A | * | 1/1987 | Beuhler et al. ............ 210/500.25 |
| 6,387,269 | B1 | * | 5/2002 | Eltner et al. .................. 210/640 |
| 6,468,331 | B2 | * | 10/2002 | Kang et al. ........................ 96/12 |
| 7,918,349 | B2 | * | 4/2011 | Mickols et al. .......... 210/500.38 |
| 8,029,857 | B2 | * | 10/2011 | Hoek et al. ...................... 427/245 |
| 8,303,692 | B2 | * | 11/2012 | Kang et al. ........................ 96/14 |
| 8,715,856 | B2 | * | 5/2014 | Choi et al. .................... 429/223 |
| 8,807,350 | B2 | * | 8/2014 | Linder et al. ............ 210/500.21 |
| 8,870,978 | B2 | * | 10/2014 | Yun et al. ...................... 29/623.5 |
| 2001/0013273 | A1 | * | 8/2001 | Kang et al. ........................ 96/11 |
| 2007/0072086 | A1 | * | 3/2007 | Nakagawa .................... 429/330 |
| 2007/0256560 | A1 | * | 11/2007 | Kang et al. ........................ 96/4 |
| 2008/0213650 | A1 | * | 9/2008 | Kohl et al. ...................... 429/40 |
| 2008/0237126 | A1 | * | 10/2008 | Hoek et al. .................... 210/637 |
| 2010/0224555 | A1 | * | 9/2010 | Hoek et al. ............... 210/500.42 |
| 2012/0219840 | A1 | * | 8/2012 | Choi et al. .................... 429/136 |
| 2013/0244338 | A1 | * | 9/2013 | Bruening et al. ............. 436/177 |
| 2014/0231351 | A1 | * | 8/2014 | Wickramasinghe et al. . 210/652 |

* cited by examiner

*Primary Examiner* — Jason M Greene
*Assistant Examiner* — Anthony Shumate
(74) *Attorney, Agent, or Firm* — IPLA P.A.; James E. Bame

(57) ABSTRACT

Provided herein is a facilitated olefin transport membrane, including: a porous support film; and a polymer electrolyte layer formed on the porous support film and including a polymer, a silver salt and an aluminum salt. The polymer has a repetitive unit including a nitrogen atom and includes an amide group.

7 Claims, 5 Drawing Sheets

FACILITATED OLEFIN TRANSPORT MEMBRANE INCLUDING ALUMINIUM SALT

CROSS REFERENCE

This application claims foreign priority under Paris Convention and 35 U.S.C. §119 to Korean Patent Application No. 10-2013-0027766, filed Mar. 15, 2013 with the Korean Intellectual Property Office.

BACKGROUND OF THE INVENTION

1. Field of the Invention

The present invention relates to a facilitated olefin transport membrane, and, more particularly, to a facilitated olefin transport membrane containing a polymer and a silver salt, which can stably maintain olefin separation performance for a long time by preventing the reduction of a silver salt.

2. Description of the Related Art

The present invention is a technology related to a composite membrane including: a polymer electrolyte layer containing a polymer, a silver salt and an aluminum salt; and a porous support film.

U.S. Pat. No. 6,468,331 discloses a technology related to a solid facilitated transport membrane having a selectivity of alkene (olefin)/alkane of 100 using a composite membrane including a polymer electrolyte layer containing a polymer and a metal salt and a porous support film. Further, U.S. Pat. No. 6,468,331 discloses a technology of selectively separating alkene-based hydrocarbons, wherein a polymer ligand and a metal cation are formed into a complex, and a double bond of alkene selectively or reversibly reacts with the metal cation of the complex to facilitate the transport of alkene, thus selectively separating alkene-based hydrocarbons.

However, the technology disclosed in U.S. Pat. No. 6,468,331 is problematic in that a silver salt is reduced to silver nanoparticles over time, and the reduction of a silver salt to silver nanoparticles deteriorates the performance of a facilitated transport membrane, and thus the facilitated transport membrane can no longer be used. In particular, $AgBF_4$, which exists generally in the form of a free ion, is easily reduced to silver nanoparticles. Therefore, a technology for suppressing the reduction of a silver salt to silver nanoparticles is required.

Meanwhile, many investigations have been attempted to better understand the mechanism of silver ion reduction. For example, it was reported that N,N-dimethylformamide (DMF) in water facilitates the reduction of silver ions. Furthermore, it was reported that functional groups in a silver-polymer electrolyte exert a great influence on the reduction of silver ions in a facilitated olefin transport membrane. Recently, it was reported that the addition of additives such as dioctyl phthalate and $HBF_4$ to a polymer/silver salt complex could be used to prevent silver ions from being reduced to silver nanoparticles. However, in these cases, there is a problem that a small amount of these additives should be added to a polymer/silver salt complex. Further, the reduction mechanism of silver ions with these additives is still unclear.

SUMMARY OF THE INVENTION

Accordingly, the present invention has been devised to solve the above-mentioned problems, and an object of the present invention is to provide a facilitated olefin transport membrane including a complex of a polymer and a silver salt and a porous support film which can stably maintain olefin separation performance for a long time by preventing the reduction of a silver salt to silver nanoparticles.

In order to accomplish the above object, an aspect of the present invention provides a facilitated olefin transport membrane, including: a porous support film; and a polymer electrolyte layer formed on the porous support film and including a polymer, a silver salt and an aluminum salt.

The polymer may have a repetitive unit including a nitrogen atom.

The polymer may include an amide group.

The polymer may include any one repetitive unit selected from the group consisting of alkyloxazoline, vinylpyrrolidone, acrylamide and N-isopropyl acrylamide.

The silver salt may be $AgBF_4$, $AgCF_3SO_3$, $AgCF_3CO_2$ or $AgPF_6$.

The aluminum salt may be $Al(NO_3)_3$, $Al_2(SO_4)_3$, $AlPO_4$ or $Al_2(CO_3)_3$.

The porous support film may be a porous polymer film or a porous ceramic film.

BRIEF DESCRIPTION OF THE DRAWINGS

The above and other objects, features and advantages of the present invention will be more clearly understood from the following detailed description taken in conjunction with the accompanying drawings, in which:

FIG. 1 shows the separation performance of a $POZ/AgBF_4/Al(NO_3)_3$ membrane over time, wherein

DESCRIPTION OF THE PREFERRED EMBODIMENTS

Figure 1A:
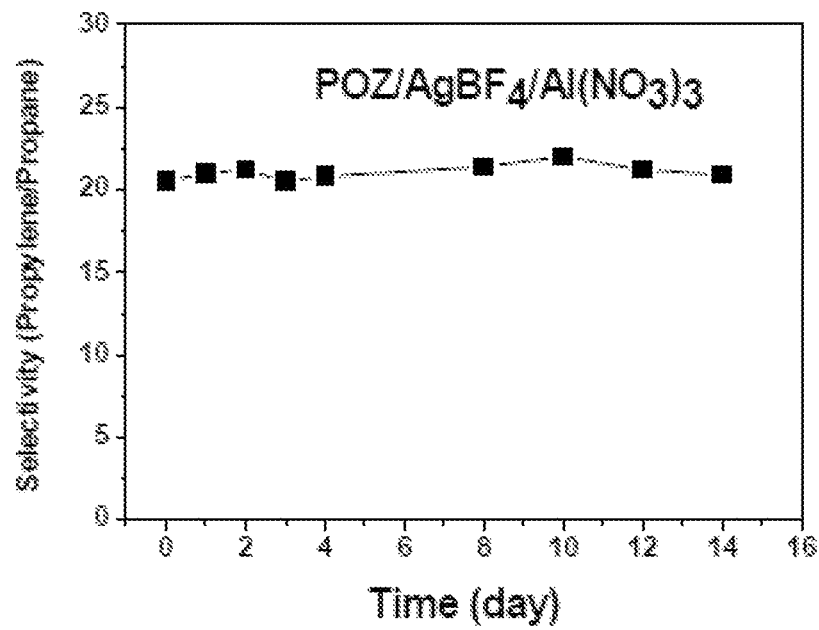
FIG. 1(a) shows selectivity of propylene to propane.

Hereinafter, preferred embodiments of the present invention will be described in detail with reference to the attached drawings.

In one aspect, the present invention provides a facilitated olefin transport membrane, including: a porous support film; and a polymer electrolyte layer formed on the porous support film and including a polymer, a silver salt and an aluminum salt.

In the facilitated olefin transport membrane, the polymer may be a polymer having a repetitive unit including a nitrogen atom or a polymer including an amide group. Here, the nitrogen atom may be a hetero atom donating an electron. Examples of the polymer may include, but are not limited to, poly(ethyleneimine), poly(alkyloxazoline), poly(vinylpyrrolidone), poly(acrylamide), and poly(N-isopropyl acrylamide).

In an embodiment of the present invention, examples of the silver salt may include, but are not limited to, silver tetrafluoroborate ($AgBF_4$), silver trifluoromethanesulfonate ($AgCF_3SO_3$), silver trifluoromethaneacetate ($AgCF_3CO_2$), and silver hexafluorophosphate ($AgPF_6$). Each of these silver salts may be used as a carrier for facilitating the accommodation of an alkene-based hydrocarbon in a polymer electrolyte. The following Experiments were carried out using $AgBF_4$, which is a typical silver salt.

In an embodiment of the present invention, examples of the aluminum salt may include, but are not limited to, $Al(NO_3)_3$, $Al_2(SO_4)_3$, $AlPO_4$, and $Al_2(CO_3)_3$. The following Experiments were carried out using $Al(NO_3)_3$, which is a typical aluminum salt.

In an embodiment of the present invention, the porous support film may be a porous polymer film or a porous ceramic film. Preferably, the porous support film may be a porous polysulfone film.

The solid facilitated olefin transport membrane of the present invention is manufactured by a process including the steps of: dissolving a silver salt, a polymer and an aluminum salt, constituting a polymer electrolyte, in a liquid solvent to prepare a coating solution; applying the coating solution onto a porous support film and then drying the same. As the liquid solvent used in this process, all kinds of solvents may be used as long as they can dissolve a silver salt, a polymer and an aluminum salt and do not damage the porous support film. If the polymer constituting a polymer electrolyte is water-soluble, water may be used as the solvent. The concentration of a metal salt and a polymer in the coating solution is determined in consideration of the thickness of a polymer electrolyte layer formed immediately after the application of the coating solution and the thickness of the polymer electrolyte layer after drying.

EXAMPLE

In the following Experiments, silver tetrafluoroborate ($AgBF_4$, 99%), aluminum nitrate ($Al(NO_3)_3$, 99%), poly(2-ethyl-2-oxazoline) (POZ, Mw=$5.0 \times 10^5$ g/mol) were purchased from Aldrich Chemical Co., and were then directly used without additional treatment.

A polymer electrolyte layer of POZ/$AgBF_4$/$Al(NO_3)_3$ was formed by dissolving $AgBF_4$ and $Al(NO_3)_3$ in an ethanol solution containing 20 wt % of POZ and then applying the mixed solution onto a porous support film. The molar ratio of POZ to $AgBF_4$ was fixed at 1:1, and the amount of $Al(NO_3)_3$ was varied.

The mixed solution was applied onto a polysulfone microporous film as a support film using a RK control coater to fabricate a membrane.

From the membrane, a solvent was removed at room temperature by nitrogen purging, and then this membrane was completely dried in a vacuum oven at room temperature for 2 days. As the result of observing the section of the membrane using a scanning electron microscope (SEM), the thickness of the polymer electrolyte layer constituting the upper portion of the membrane was about 1 μm.

EXPERIMENTAL EXAMPLES

Hereinafter, with reference to the following Experimental Examples, it will be verified that the membrane of the present invention exhibits long-term performance thanks to an aluminum salt, and it will be explained that the reduction of a silver salt is prevented thanks to an aluminum salt.

Experimental Example 1

Separation Performance of a Propylene/Propane Mixed Gas

Gas permeance was measured using a mass flow meter. The unit of gas permeance is GPU (=$1 \times 10^{-6}$ $cm^3$(STP)/($cm^2$ sec cmHg). The permeance of a mixed gas (a propylene/propane mixed gas of 50:50 vol %) was measured using gas chromatography.

Figure 1B:
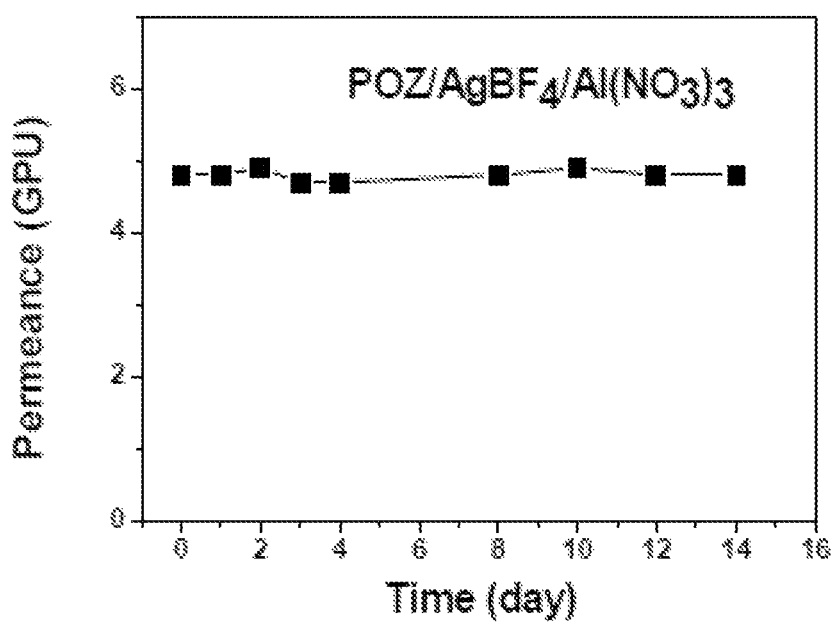
FIG. 1(b) shows the permeance of a propylene/propane mixed gas.

The experiment of the long-term separation performance of the propylene/propane mixed gas was carried out in order to evaluate the stability of a POZ/$AgBF_4$/$Al(NO_3)_3$ composite membrane. FIG. 1 shows the separation performance of a POZ/$AgBF_4$/$Al(NO_3)_3$ composite membrane (POZ:$AgBF_4$:$Al(NO_3)_3$=1:1:0.1), wherein FIG. 1(a) shows the selectivity of propylene to propane, and FIG. 1(b) shows the permeance of a propylene/propane mixed gas. For reference, in a POZ/$AgBF_4$ membrane which is a facilitated olefin transport membrane having a polymer electrolyte layer including a polymer and a silver salt without an aluminum salt, the selectivity of propylene to propane and the permeance of the propylene/propane mixed gas were decreased (that is, the separation performance thereof was deteriorated) over time. However, in the POZ/$AgBF_4$/$Al(NO_3)_3$ composite membrane of the present invention, the selectivity of propylene to propane and the permeance of the propylene/propane mixed gas were maintained constant for 14 days, and thus it was ascertained that the performance stability of the POZ/$AgBF_4$/$Al(NO_3)_3$ composite membrane of the present invention was improved because an aluminum salt.

The fact that the separation performance of a conventional POZ/$AgBF_4$ membrane is consistently deteriorated over time means that an olefin carrier is inactivated, which means that silver ions are reduced to silver nanoparticles. The amide group of POZ activates the reduction reaction of silver, and thus the reduction of silver in a polymer/silver salt complex occurs easily. In contrast, in the POZ/$AgBF_4$/$Al(NO_3)_3$ membrane of the present invention, the selectivity and permeance thereof were maintained constant for 14 days, which means that, in the membrane of the present invention, unlike the conventional membrane, silver ions are very stably maintained by the addition of an aluminum salt, and thus the aluminum salt serves as an olefin carrier.

Experimental Example 2

Measurement of Color Change of Sample

Figure 2A:
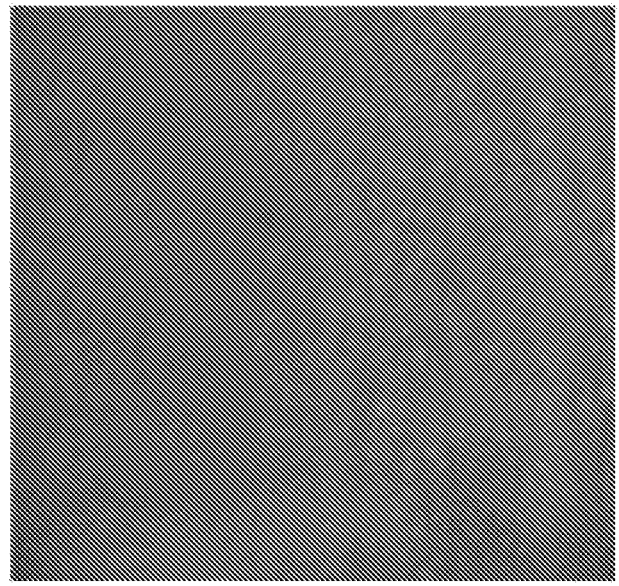
FIG. 2(a) is a photograph of a $POZ/AgBF_4$ film after exposure at room temperature for 2 days.
Figure 2B:
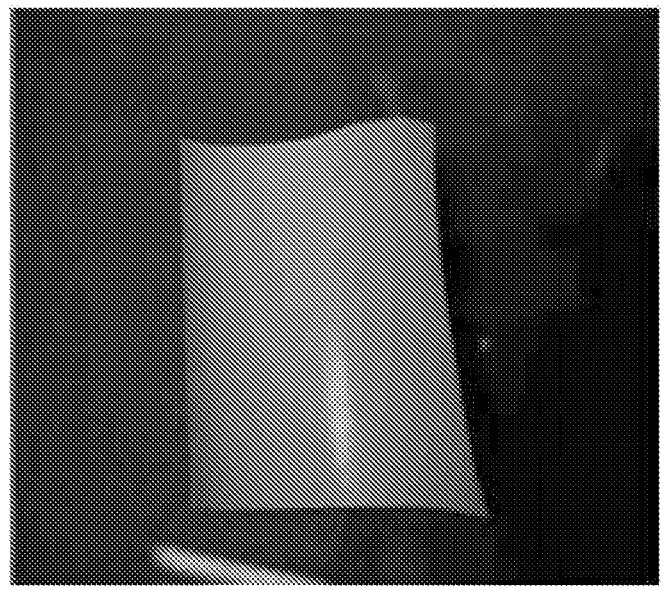
FIG. 2(b) is a photograph of a $POZ/AgBF_4/Al(NO_3)_3$ film after exposure at room temperature for 3 months.

FIG. 2(a) is a photograph of a 1/1 POZ/$AgBF_4$ film after exposure at room temperature for 2 days, and FIG. 2(b) is a photograph of a 1/1/0.1 POZ/$AgBF_4$/$Al(NO_3)_3$ film after exposure at room temperature for 3 months.

FIG. 2(a) shows that the color of a POZ/$AgBF_4$ film, which is a conventional membrane, was changed from white to black at room temperature in only two days. Here, this color change means that silver ions are reduced to silver nanoparticles. In contrast, FIG. 2(b) show that the color of a POZ/$AgBF_4$/$Al(NO_3)_3$ film, which is a membrane of the present invention, was maintained white even after it was exposed at room temperature for 3 months or more. Here, this fact means that silver ions are stably maintained without being reduced in the film.

From the results of Experimental Examples 1 and 2, it can be ascertained that an aluminum salt ($Al(NO_3)_3$) prevents the reduction of silver ions, thus exerting an influence on maintaining the performance of a membrane.

Hereinafter, mechanisms for preventing the reduction of silver ions using an aluminum salt will be described with reference to the following Experimental Examples 3 to 5.

Experimental Example 3

FT-IR Spectroscopy

The behavior of $Al(NO_3)_3$ as an aluminum salt in the POZ/$AgBF_4$/$Al(NO_3)_3$ complex was investigated by FT-IR spectroscopy. The coordinative interaction between a silver ion and a polar atom of a polymer matrix results in dissolution of a silver salt into the polymer matrix to form a polymer-silver complex or a silver-polymer electrolyte. The change in the coordinative interaction between Ag+ and the C=O group of POZ resulting from introduction of $Al(NO_3)_3$ was observed using FT-IR spectroscopy.

Figure 3:
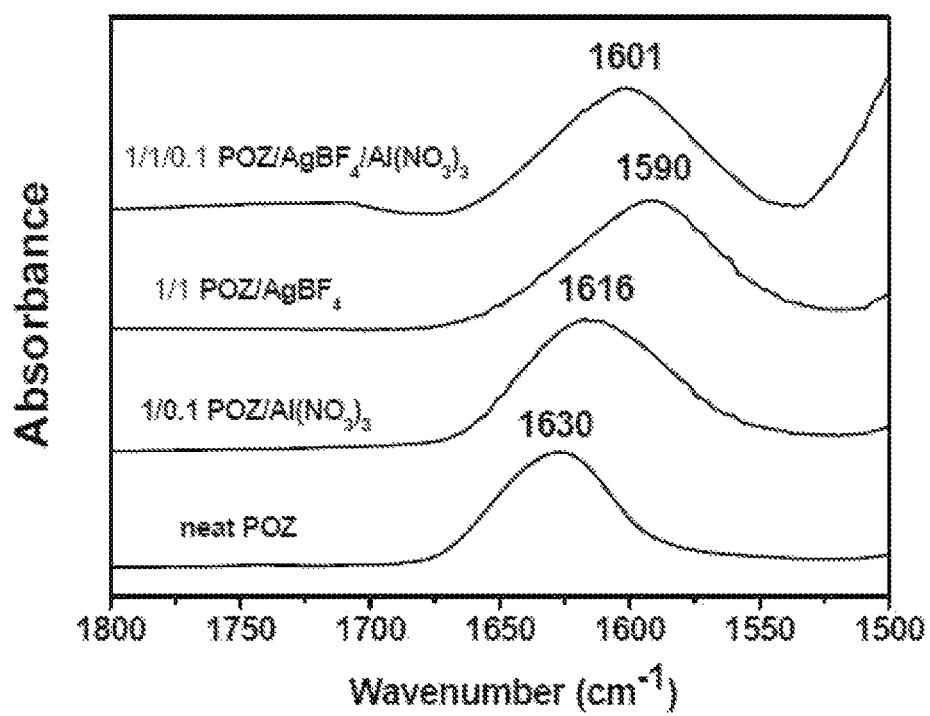
FIG. 3 shows FT-IR spectra of pure POZ, 1/0.1 POZ/Al$(NO_3)_3$, 1/1 $POZ/AgBF_4$, and 1/1/0.1 $POZ/AgBF_4/Al(NO_3)_3$.

FIG. 3 shows FT-IR spectra of pure POZ, 1/0.1 POZ/Al$(NO_3)_3$, 1/1 POZ/AgBF$_4$, and 1/1/0.1 POZ/AgBF$_4$/Al$(NO_3)_3$. The C=O stretching band of pure POZ at 1630 cm$^{-1}$ was found to shift to a lower wave number at 1590 cm$^{-1}$ upon incorporation of AgBF$_4$ into POZ, presumably due to the weakening of the C=O double bond caused by electron donation from the carbonyl oxygen to silver ion. On the other hand, when Al$(NO_3)_3$ was incorporated into pure POZ, the C=O stretching band at 1630 cm$^{-1}$ was found to shift to a lower wave number at 1616 cm$^{-1}$. These results suggest that the coordinative interaction between Al$^{3+}$ and the C=O group of POZ exists, which is relatively weaker than the interaction between Ag+ and the C=O group of POZ.

When Al$(NO_3)_3$ was added to the POZ/AgBF$_4$ complex, the position of the C=O stretching band was shifted to higher wave number, from 1590 to 1601 cm$^{-1}$, which means that the interaction between the C=O and silver ion became weaker. These results are attributed to the fact that the interaction between NO$_3^-$ anions of Al$(NO_3)_3$ and silver ions weakens the interaction between the C=O of POZ and silver ions.

Experimental Example 4

FT-Raman Spectroscopy

The ionic constituents (i.e. free ions, ion pairs, and higher-order aggregates) of NO$_3^-$ and BF$_4^-$ were measured by FT-Raman spectroscopy to investigate the coordinative interaction in POZ/AgBF$_4$/Al$(NO_3)_3$. Note that the NO$_3^-$ stretching bands at 1034, 1040 and 1045 cm$^{-1}$ were assigned to free ions, ion pairs and ion aggregates, respectively. For the case of BF$_4^-$, the peaks for free ions, ion pairs, and higher order ion aggregates were at 765, 770 and 774 cm$^{-1}$, respectively.

Figure 4A:
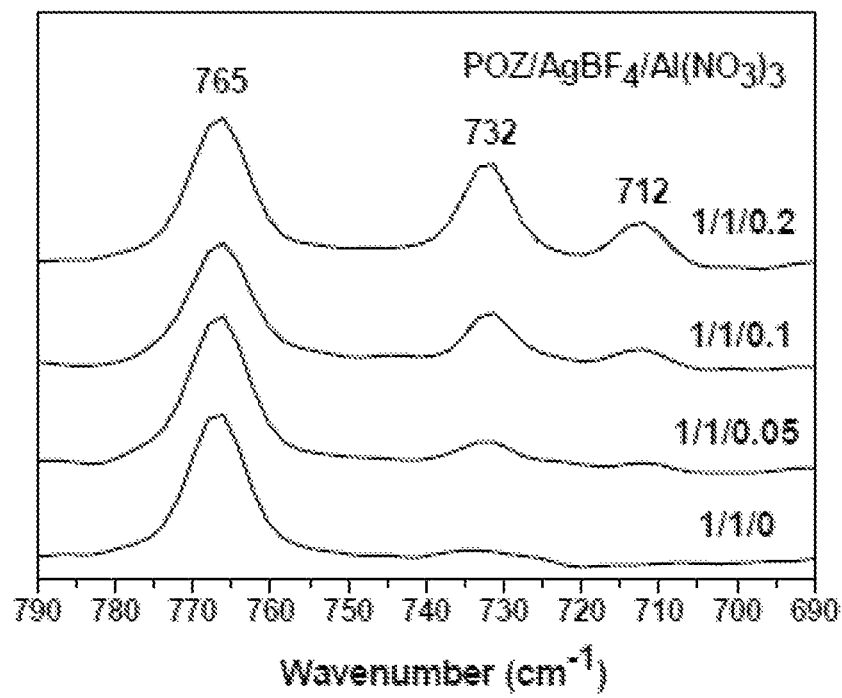
FIG. 4 shows FT-Raman spectra of $POZ/AgBF_4/Al(NO_3)_3$ electrolyte layers according to various molar ratios of $Al(NO_3)_3$ to $AgBF_4$ in the (a) $BF_4^-$ stretching band and (b) $NO_3^-$ stretching band.

The Raman spectra of POZ/AgBF$_4$/Al$(NO_3)_3$ electrolyte layers according to various mole ratios of Al$(NO_3)_3$ are shown in FIGS. 4(a) and (b) in the regions of the BF$_4^-$ and NO$_3^-$ stretching bands, respectively.

FIG. 4(a) shows that, as the mole ratio of Al$(NO_3)_3$ in the 1/1 POZ/AgBF$_4$ complex was increased, the peak intensity observed at 765 cm$^{-1}$ was somewhat decreased, which is due to the fact that the concentration of BF$_4^-$ free ions was decreased. On the other hand, new peak intensities were observed at 732 and 712 cm$^{-1}$, which was increased with an increase in the mole ratio of Al$(NO_3)_3$ in the POZ/AgBF$_4$ complex. The observation of new peaks indicates that a new complex between F$^-$ and Al$^{3+}$ was formed.

Figure 4B:
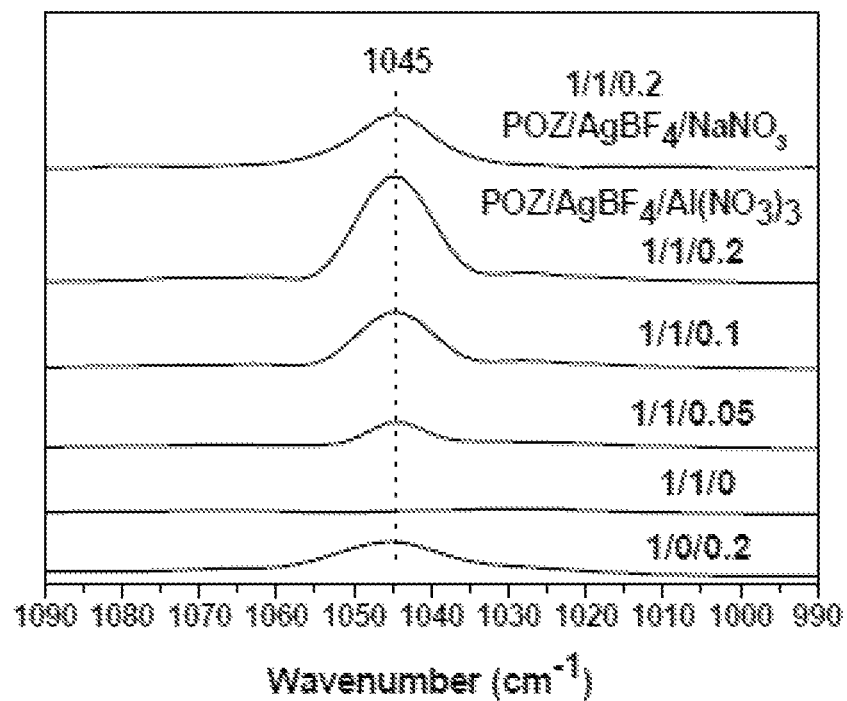

FIG. 4(b) shows that, as the mole ratio of Al$(NO_3)_3$ in the 1/1 POZ/AgBF$_4$ complex was increased, the peak intensity observed at 1045 cm$^{-1}$ was increased considerably compared to that in the 1/0.2 POZ/Al$(NO_3)_3$ complex, which indicates an increase in the concentration of NO$_3^-$ ion aggregates. Furthermore, the intensity of NO$_3^-$ ion aggregates in 1/1/0.2 POZ/AgBF$_4$/Al$(NO_3)_3$ was much higher than that in 1/1/0.2POZ/AgBF$_4$/NaNO$_3$. These results indicate that higher-order NO$_3^-$ ion aggregates were easily formed in the POZ/AgBF$_4$/Al$(NO_3)_3$ complex because the interaction between Al$^{3+}$ and its counter anions became weaker. These interactions were attributable to the favorable interaction between F$^-$ and Al$^{3+}$, resulting in a looser interaction between Al$_{3+}$ and its counter anions.

Experimental Example 5

Binding Energies

The binding energies of silver and fluorine ions in the POZ/AgBF$_4$/Al$(NO_3)_3$ system were measured using XPS to investigate the chemical environments of the silver and fluorine ions.

FIG. 5 shows the results of XPS of 1/1 POZ/AgBF$_4$, 1/1/0.1 POZ/AgBF$_4$/Al$(NO_3)_3$, wherein (a) shows the binding energy of silver ions and (b) shows the binding energy of fluorine ions.

Figure 5A:
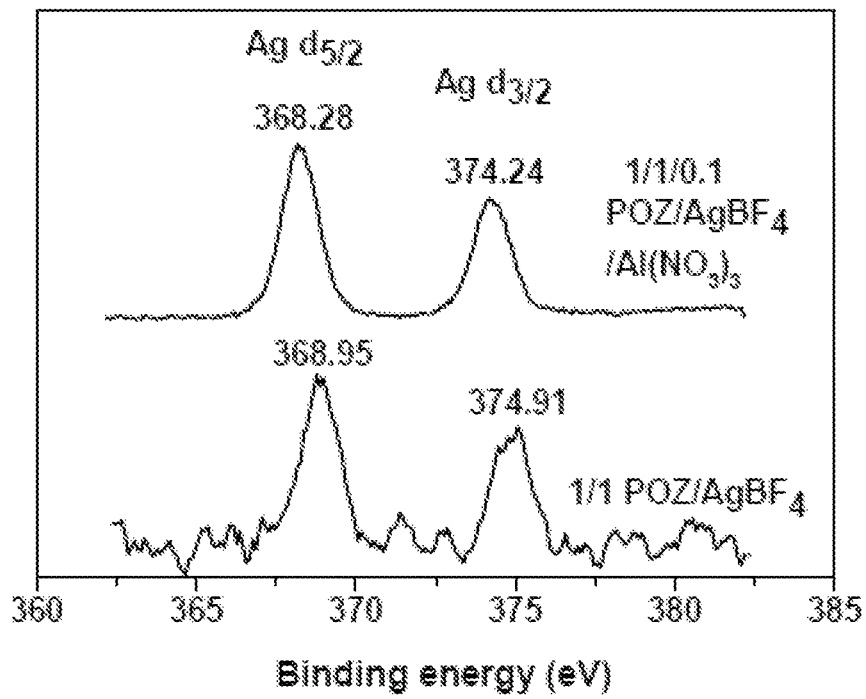
FIG. 5 shows the results of XPS of 1/1 $POZ/AgBF_4$, 1/1/0.1 $POZ/AgBF_4/Al(NO_3)_3$, wherein (a) shows the binding energy of silver ions and (b) shows the binding energy of fluorine ions.

Referring to FIG. 5(a), the Ag3d5/2 spectrum of POZ/AgBF$_4$ was found to contain a single peak at 368.95 eV, but the binding energy was decreased to 368.28 eV by the addition of Al$(NO_3)_3$ to POZ/AgBF$_4$. The result is presumed due to the weakened interaction between silver ions and counter anions, which was attributable to interaction between BF$_4^-$ and Al$^{3+}$.

Figure 5B:
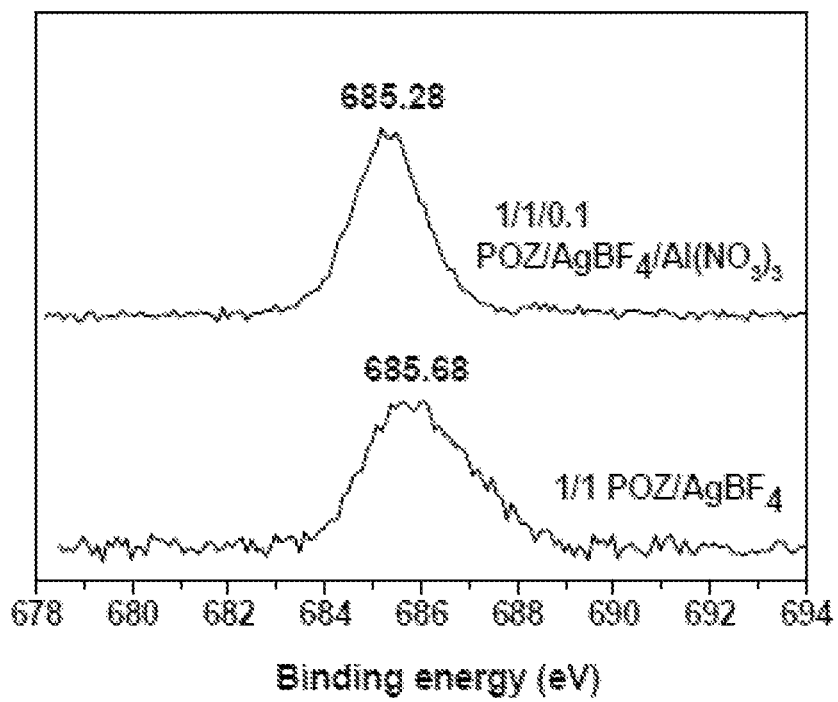

Referring to FIG. 5(b), the binding energy of fluorine ions was decreased from 685.68 to 685.28 eV by the addition of Al$(NO_3)_3$ to POZ/AgBF$_4$. The decreased binding energy of fluorine ions can be rationalized on the basis of two interactions: the interaction between Ag+ and NO$_3^-$ of Al$(NO_3)_3$, and the interaction between F$^-$ and Al$^{3+}$.

Heretofore, from the results of the above Experimental Examples, it can be ascertained that, in the case of the POZ/AgBF$_4$/Al$(NO_3)_3$ complex film of the present invention, silver ions was stable for three months or more without being reduced. This long-term stability of silver ions exhibiting excellent separation performance in the membrane without being reduced is attributable to the formation of ionic aggregates between Ag$^+$ of AgBF$_4$ and NO$_3^-$ of Al$(NO_3)_3$. Further, from the experiment results of XPS, it can be ascertained that the strong interaction between F$^-$ of AgBF$_4$ and Al$^{3+}$ of Al$(NO_3)_3$ allows NO$_3^-$ of Al$(NO_3)_3$ to easily coordinate with Ag$^+$, thus preventing the reduction of silver ions.

As described above, the facilitated olefin transport membrane according to the present invention can solve the conventional problem of membrane performance being deteriorated over time by the reduction of a silver salt to silver nanoparticles, because it further includes an aluminum salt in addition to a polymer and a silver salt. In particular, it can be ascertained that, in the case of the facilitated olefin transport membrane including a polymer electrolyte layer of POZ/AgBF$_4$/Al$(NO_3)_3$, a silver salt is not reduced, and the performance of facilitating the transport of olefin can be maintained while selectivity and permeability are maintained.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A facilitated olefin transport membrane, comprising:
   a porous support film; and
   a polymer electrolyte layer formed on the porous support film and including a polymer, a silver salt and an aluminum salt.

2. The facilitated olefin transport membrane of claim 1, wherein the polymer has a repetitive unit including a nitrogen atom.

3. The facilitated olefin transport membrane of claim 1, wherein the polymer includes an amide group.

4. The facilitated olefin transport membrane of claim 1, wherein the polymer includes any one repetitive unit selected from the group consisting of alkyloxazoline, vinylpyrrolidone, acrylamide and N-isopropyl acrylamide.

5. The facilitated olefin transport membrane of claim 1, wherein the silver salt is $AgBF_4$, $AgCF_3SO_3$, $AgCF_3CO_2$ or $AgPF_6$.

6. The facilitated olefin transport membrane of claim 1, wherein the aluminum salt is $Al(NO_3)_3$, $Al_2(SO_4)_3$, $AlPO_4$ or $Al_2(CO_3)_3$.

7. The facilitated olefin transport membrane of claim 1, wherein the porous support film is a porous polymer film or a porous ceramic film.

* * * * *